July 9, 1963   L. R. SINDELAR   3,096,541
APPARATUS FOR MOLDING VALVE RECEIVING APERTURE IN A TIRE
Filed Sept. 11, 1958   2 Sheets-Sheet 1

INVENTOR.
LAWRENCE R. SINDELAR
BY
ATTORNEY

July 9, 1963   L. R. SINDELAR   3,096,541
APPARATUS FOR MOLDING VALVE RECEIVING APERTURE IN A TIRE
Filed Sept. 11, 1958   2 Sheets-Sheet 2
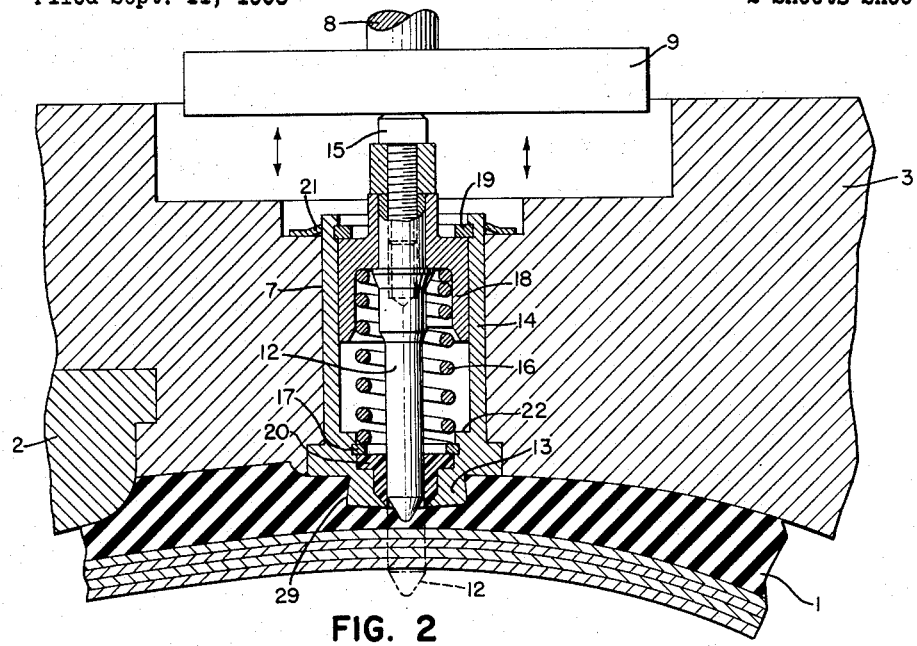
FIG. 2
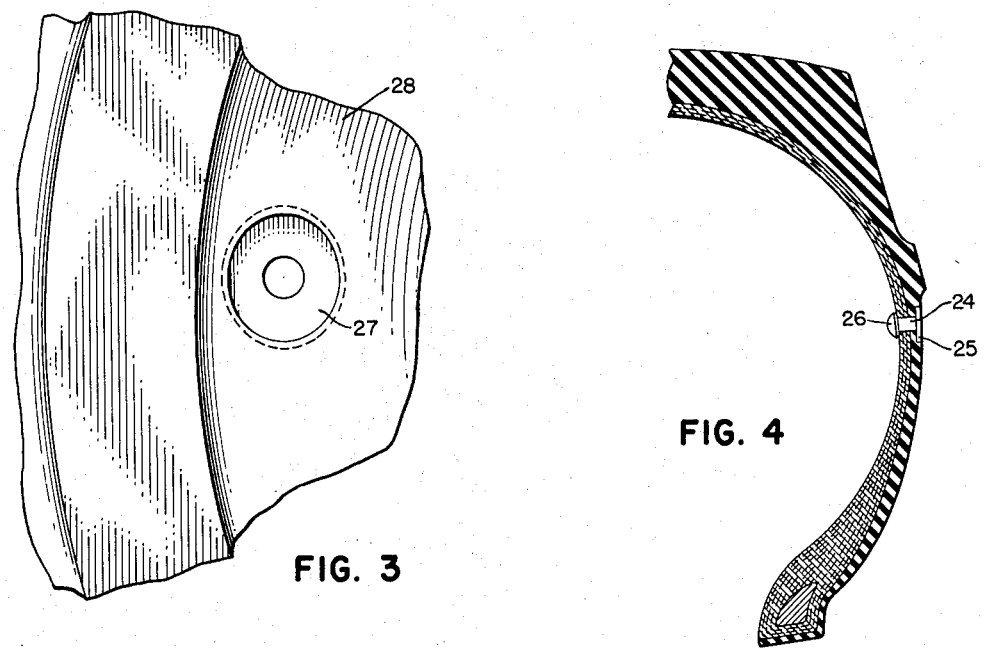
FIG. 3
FIG. 4
INVENTOR.
LAWRENCE R. SINDELAR
BY
ATTORNEY United States Patent Office 3,096,541
Patented July 9, 1963

3,096,541
APPARATUS FOR MOLDING A VALVE RECEIVING APERTURE IN A TIRE
Lawrence R. Sindelar, Cuyahoga Falls, Ohio, assignor to The Goodyear Tire & Rubber Company, Akron, Ohio, a corporation of Ohio
Filed Sept. 11, 1958, Ser. No. 760,346
6 Claims. (Cl. 18—2)

This invention relates to molding inflatable articles and in particular to molding a valve receiving aperture in the sidewall of a tire.

The use of sidewall valves to inflate pneumatic tires has become increasingly more common in recent years. Such valves may be required to inflate one or more chambers in a tire having multiple compartments therein which perform certain safety functions. Furthermore, as the design of the modern automobile tends towards lower silhouettes, it has been necessary to reduce the size of the wheel structure to meet this desired end. The reduction in wheel rim size has rendered it difficult to place a conventional valve in the rim of a wheel and, therefore, has favored the use of a valve in the sidewall area of a conventional single chambered tire when mounted on the smaller diameter wheel.

The sidewall valves used are normally composed of an elastomeric material, such as rubber, and comprise a substantially cylindrical body portion with an enlarged head portion designed to be seated in a corresponding depression in the exterior surface of the tire sidewall. Providing an aperture to receive such valves has presented many varied problems. Initially the approach was to manufacture a tire and completely vulcanize it and thereafter drill a hole in the desired location. This technique was unsatisfactory since it led to damage to the reinforcing elements in the tire sidewall and also increased the likelihood of leakage around the valve body. Such difficulties are discussed in copending application Serial Number 677,326, filed August 9, 1957, now Patent No. 3,025,569. The invention of the copending application involves the use of hand inserted removable mold pins for the purposes of forming the valve receiving opening. While the apertures so formed are in general satisfactory, the possibility of the loss of a pin has created some problems. In addition, templates are required to accurately locate the mold pin in relation to the tire. Furthermore, it is inherent in the method of the application referred to that the pin must be inserted in the green tire prior to vulcanization. It has been discovered that loose hand inserted pins may be replaced by automatic pin inserting mechanisms of the type described in the present case which results in a lower cost, more uniform product. These mechanisms possess definite advantages in that the time and position of insertion of the pin may be very accurately controlled so that the ultimate product is superior to one produced by the method of the application referred to.

It is a principal object of the present invention to provide an apparatus for accurately controlling the location of the valve receiving aperture in the sidewalls of tires of varying sizes.

It is a further object of the present invention to provide an apparatus for forming a valve receiving aperture in a tire with a minimum risk of damage to the tire.

It is an additional object of the present invention to provide an apparatus for inserting a pin into the sidewall of a tire during vulcanization in such a manner and in such a way as to assure a uniform serviceable product.

It is a still further object of the present invention to provide apparatus for inserting a pin into a tire sidewall which can be uilized without modification in the production of a variety of tires of different sizes.

These and other objects of the present invention will become apparent from the following description and drawings in which:

FIG. 2 is a detail of a portion of the inserting apparatus shown in FIG. 1;

FIG. 3 shows a part of a tire sidewall having a valve receiving aperture molded therein; and FIG. 4 is a partial cross section of a typical tubeless tire having a valve mounted in the sidewall.

Figure 1:
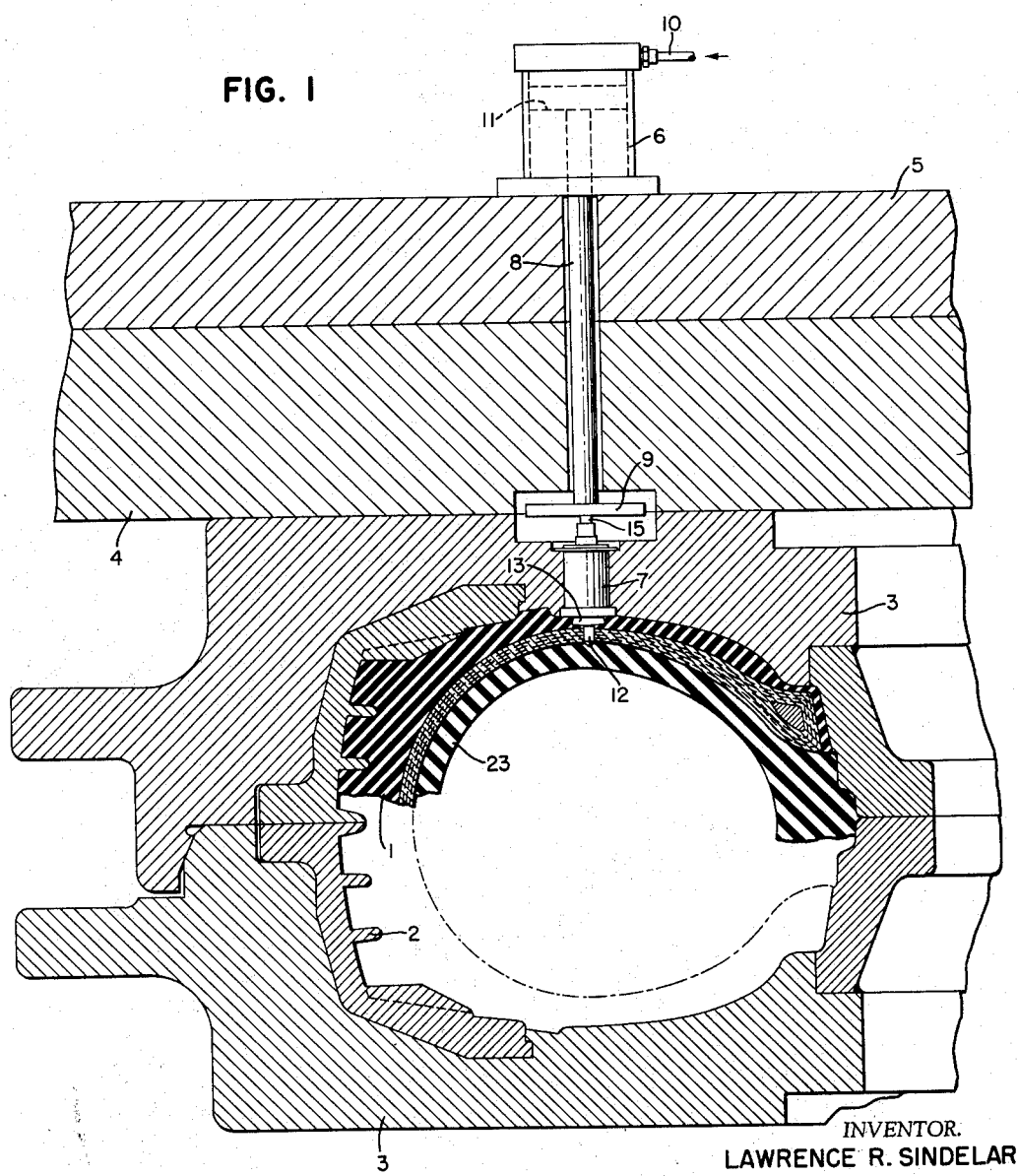
FIG. 1 is a cross sectional view of a typical tire vulcanization press containing a pin inserting apparatus according to the present invention.

It has been found that with the location of the pin inserting unit adjacent the mold rings certain disadvantages arise. One of these disadvantages is that an entire new unit is necessary for each size mold utilized. In addition, the maintenance and utilization of the air lines through the mold rings has been found to be difficult. Moreover, with an air actuated cylinder in certain other positions, there is a possibility of leakage into the vulcanizing mold which may result in damage to the tire or formation of air blisters in the plies as the air seeps along the molding pin. The present invention successfully avoids these difficulties by the provision of a highly reliable actuating unit which is located externally to the mold matrix or rings and which can be used in molds of varying sizes and, hence, tire diameters.

Referring to FIG. 1, a tire 1 is shown in a typical vulcanizing press or mold comprising a tread matrix 2, mold rings 3, steam platen 4, and bolster platen 5. An actuating unit 6, mounted on the bolster platen, is connected to the mold pin unit 7 by means of movable rod 8 having a presser foot 9 on the inner end thereof which contacts the mold pin 12 at its outer end 15. The actuating unit 6 is supplied with air through the line 10 to the outer side of a piston 11 connected to rod 8. When it is desired to insert the pin into the tire sidewall, air is applied to the outer side of piston 11 which forces the rod 8 and presser foot 9 towards the tire and inserts the pin 12 by pressure on its outer end as shown. A boss 13, located generally concentrically with pin 12, projects into the mold cavity and forms a valve head receiving depression in the tire sidewall.

The mold pin unit 7 is illustrated in greater detail in FIG. 2. The pin 12 is shown in its retracted position with its advance position indicated by the broken lines. The pin 12 is mounted inside a retaining cylinder 14 and is normally held in the retracted position with its outer end 15 abutting the presser foot 9 by compression spring 16. Spring 16 is held in position by locking ring 17 and the generally cupped shaped portion 18 on the outer intermediate portion of the pin 12. The pin is held in position at its intermediate portion by a lock ring 19. A sealing gasket 20, surrounding the pin 12 at its inner end, guides the pin and prevents rubber from the tire from entering the pin mechanism. The entire mold pin unit 7 is held in position in the mold by locking ring 21. The length of travel of the pin may be governed in a variety of ways, the manner utilized in the drawing being the extent of the cupped shaped portion 18 and the distance to the internal shoulder 22 of the cylinder 14. Obviously spacers may be used to vary this distance as desired.

The operation of the complete device may be clearly understood by referring to FIG. 1. When the tire 1 is placed in the mold, generally it contains a curing bag or bladder 23 which is inflated by steam and air pressure to expand the tire outwardly against the matrix 2 and the mold rings 3. In certain recently developed automatic tire presses, the bag or bladder has been eliminated. In such devices a ring is used to seal the opening between the tire beads and the tire chamber is inflated to expand the green carcass into contact with the mold or matrix surfaces. However, regardless of the type of press used, some means is provided in the vulcanizing press to expand the tire to its final vulcanized size and shape. When the tire is expanded, steam is supplied to the platens 4 through conventional means (not shown) which heats the moldings 3 to vulcanize the tire. This sequence of events is controlled by a mold automatic timer of a conventional type which is widely used in the industry and need not be described here. The pin inserting mechanism may also be controlled by the same timer so that at the desired moment air is transmitted through line 10 to the outer face of piston 11 which actuates to insert the pin 12 into the sidewall of the tire through the mechanical means previously described. By varying the setting at the timer control, the insertion of the pin may be made at any desired time.

It has been discovered that it is preferable to delay the insertion of the pin until after the tire is expanded in the mold and heat has been supplied for a sufficient time to cause the elastomer in the tire to become plastic to permit easy penetration of the sidewall by the pin. However, it is undesirable to wait overly long to insert the pin since a partial cure will have taken place and the insertion of the pin may become not only difficult but likely to damage the cords in the reinforcing plies of the tire since the cords cannot freely move in a partially cured tire to permit the free entry of the pin. According to the present invention, the pin may be inserted in the tire most satisfactorily at least two minutes and not later than seven minutes after the application of heat to the tire. It is preferable that the pin be inserted at about five minutes after the initial application of heat. Furthermore, it has been found that the use of 100 pound air pressure in the actuating mechanism 6 and a 15–25 pound return spring 16 will insert and retract the pin. Under such circumstances it has been found that the pin will be inserted over a period of approximately five seconds. This permits the tire cords to shift gradually to permit the entrance of the pin into the tire sidewall without any cord breakage or severing. Subsequently, while the elastomer of the tire is plastic, the cords will tend to return to their original straight line position to enclose the walls of the valve receiving aperture in a long arc which will assure a firm holding of a valve mounted therein and avoid excessive pressure on the valve body which might result in the cutting of the valve during subsequent service.

FIG. 3 illustrates a portion of a tire sidewall having a valve receiving aperture therein. As previously mentioned, sidewall valves such as illustrated in FIG. 4 usually comprise a generally cylindrical body portion 24 having a generally cylindrical enlarged head portion 25 on the outer end which is designed to seat in a depression in the exterior tire sidewall. The valve may also have an enlarged head portion 26 on the inner end in order to prevent expulsion of the valve due to internal tire pressure. It has been discovered that, when a tire having a valve head receiving depression of a generally circular cross section is inflated, the walls of the tire tend to pull away from the valve head as they are distended. This results in an unsightly product since dirt may collect in the arcuate cracks around the valve head. Furthermore, foreign matter which might collect in such an area will abrade the valve during service resulting in early failure of the valve and, consequently, deflation of the tire.

According to the present invention, the boss 13 on the inner end of the pin unit 7 is provided with a generally elliptical transverse cross-section having its major axis tangential to a circumferential arc on the tire sidewall passing through the center of the valve receiving aperture. In addition, the major diametric axis of the ellipse is chosen somewhat smaller than the diameter of the head of the valve to be seated in the depression formed by boss 13. The reason for this is that it has been discovered that when a tire having a sidewall opening of the type described is inflated, the head receiving depression 27 in the sidewall 28 illustrated in FIG. 3 is distorted as the tire inflates and enlarges, assuming a generally circular cross-section. The major axis of the ellipse is chosen so that the circular depression resulting upon tire inflation and distension of the tire sidewalls is substantially the same in diameter as the valve head to be retained therein. Boss 13 is also provided with a slight taper on the sidewalls as at points 29 so that the elliptical depression 27 is provided with undercut walls as illustrated in FIG. 3. The molded taper thus formed in the walls of the head receiving depression acts to retain the compressed valve head within the smaller recess until the tire is inflated and the recess expands to the final circular configuration. Thus, the valve will not be accidentally ejected from the tire before initial inflation, nor during any subsequent deflation due to accident or repairs.

While certain representative embodiments and details have been shown for the purpose of illustrating the invention, it will be apparent to those skilled in this art that various changes and modifications may be made therein without departing from the spirit or scope of the invention.

I claim:

1. Apparatus as claimed in claim 6 for molding an aperture in a tire sidewall while said tire is in a vulcanizing press, said aperture to receive a valve having a body portion and an enlarged substantially cylindrical head portion located at the exterior surface of the tire sidewall, said apparatus including boss means having a substantially elliptical transverse cross section and concentrically located with respect to said pin with the long axis of the ellipse substantially tangential to a circumferential line on said tire sidewall through said aperture, said boss extending into said tire mold cavity to form an elliptical depression in said tire sidewall which distends upon inflation of the tire to a substantially circular cross section to accommodate said valve head.

2. Apparatus as claimed in claim 1 in which said boss is provided with tapered sidewalls to form a depression in the tire having undercut wall portions to grip and retain the valve head in the depression when the tire is in a deflated condition.

3. Apparatus for molding a valve receiving aperture in the sidewall of a tire while said tire is in a vulcanization mold comprising, in combination, an elongated pin having a cross-sectional shape to form the desired valve receiving aperture in said tire sidewall, said pin being located in the mold portion of said press adjacent the mold cavity and movable along its longitudinal axis in a line substantially perpendicular to said tire sidewall for a distance sufficient to completely pierce said sidewall, actuating means to insert said pin into said sidewall, said actuating means being located substantially removed from the mold portion of said press, means coupling said actuating means and said pin to effect movement of said pin upon operation of said actuating means, said coupling means having an enlarged presser means adjacent the inward end to contact said pin when it is in a variety of locations whereby tires of various sizes may be accommodated, spring means associated with said pin to retract said pin from said sidewall upon deenergization of said actuating means, and means responsive to the control mechanism of said press to energize said actuating means to insert said pin through said sidewall at a predetermined time during the vulcanization of said tire to form an aperture therein.

4. Apparatus as claimed in claim 3 for molding an aperture to receive a valve having a body portion and an enlarged substantially cylindrical head portion located on the exterior surface of the tire, said apparatus including boss means having a substantially elliptical transverse cross section and concentrically located with respect to said pin with the long axis of the ellipse substantially tangential to a circumferential line on said tire sidewall through said aperture, said boss extending into said tire mold to form an elliptical depression in said tire sidewall which distends upon inflation of the tire to a substantially circular cross section to accommodate said valve head.

5. Apparatus as claimed in claim 4 in which said boss is provided with tapered sidewalls to form a depression in the tire having undercut wall portions to grip and retain the valve head in the depression when the tire is in a deflated condition.

6. Apparatus for molding a valve receiving aperture in the sidewall of a tire while said tire is in a vulcanizing press comprising, in combination, an elongated pin having a cross-sectional shape to form the resired valve receiving aperture in said tire sidewall, said pin being located in the mold portion of said press adjacent the mold cavity and movable along its longitudinal axis in a line substantially perpendicular to said tire sidewall for a distance sufficient to completely pierce said sidewall, actuating means to insert said pin into said sidewall, said actuating means being located substantially removed from the mold portion of said press, means coupling said actuating means and said pin to effect movement of said pin upon operation of said actuating means, said coupling means being provided with enlarged presser means adjacent the inward end thereof to contact said pin when it is in any one of a variety of locations whereby tires of various sizes may be accommodated by said apparatus, and means responsive to the control mechanism of said press to energize said actuating means to insert said pin through said sidewall at a predetermined time during the vulcanization of said tire and after full pressurization thereof to form an aperture therein.

References Cited in the file of this patent

UNITED STATES PATENTS

| | | |
|---|---|---|
| 1,195,118 | Weida | Aug. 15, 1916 |
| 1,385,591 | Stafiej | July 26, 1921 |
| 1,471,160 | House | Oct. 16, 1923 |
| 1,666,883 | Lambert | Apr. 17, 1928 |
| 1,718,631 | Brundage | June 25, 1929 |
| 1,733,064 | Lambert | Oct. 22, 1929 |
| 1,805,275 | Bishop | May 12, 1931 |
| 1,945,098 | Thorburn | Jan. 30, 1934 |
| 2,318,378 | Crowley | May 4, 1943 |
| 2,321,319 | Rempel | June 8, 1943 |
| 2,363,508 | Doster et al. | Nov. 28, 1944 |
| 2,396,406 | Anderson | Mar. 12, 1946 |
| 2,509,882 | Roberts | May 30, 1950 |
| 2,693,005 | Briscoe et al. | Nov. 2, 1954 |
| 2,931,261 | Crandall | Apr. 5, 1960 |
| 3,025,569 | Riggs | Mar. 20, 1962 |